Z. SWOPE.
Imp't in Hand Harvester.
110799
PATENTED JAN 3 1871
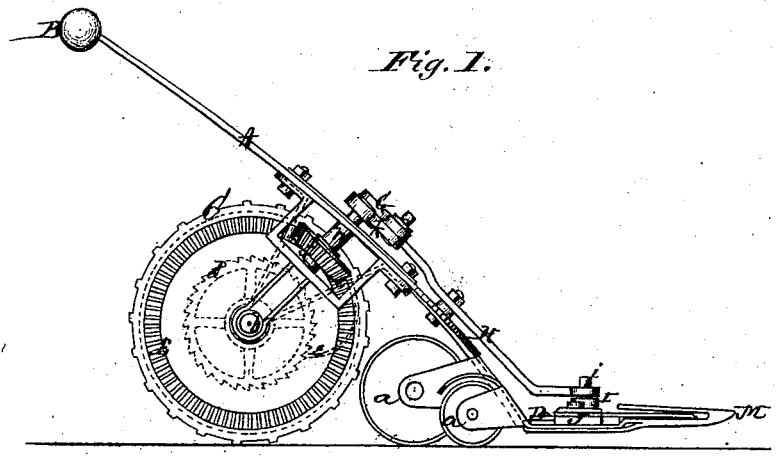
Fig. 1.
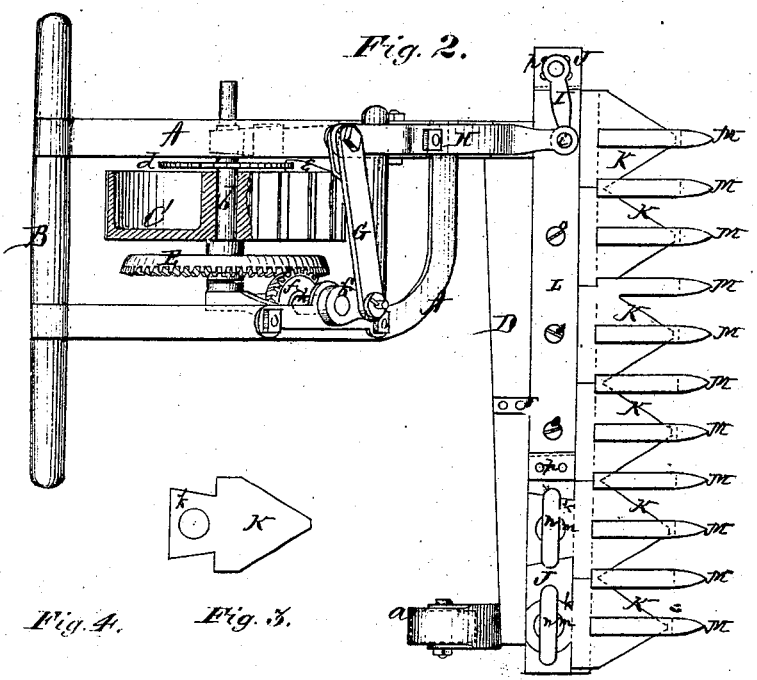
Fig. 2.
Fig. 4. Fig. 3.
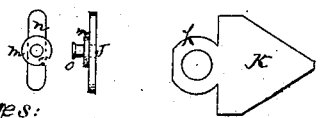
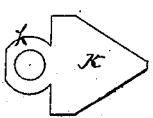
Witnesses:
Inventor:
Zuriel Swope

United States Patent Office.

ZURIEL SWOPE, OF LANCASTER, PENNSYLVANIA.

Letters Patent No. 110,799, dated January 3, 1871.

IMPROVEMENT IN MOWING-MACHINES.

The Schedule referred to in these Letters Patent and making part of the same.

*To all whom it may concern:*

Be it known that I, ZURIEL SWOPE, of Lancaster, in the county of Lancaster and in the State of Pennsylvania, have invented certain new and useful Improvements in Hand-mowing Machines; and do hereby declare that the following is a full, clear, and exact description thereof, reference being had to the accompanying drawing and to the letters of reference marked thereon making a part of this specification.

The nature of my invention consists in the construction and arrangement of a "hand-mowing machine," as will be hereinafter fully set forth.

In order to enable others skilled in the art to which my invention appertains to make and use the same, I will now proceed to describe its construction and operation, referring to the annexed drawing, in which—

Figure 1 is a side view, and
Figure 2 is a plan view of my entire machine;
Figure 3 shows the shape of the knives, and
Figure 4 illustrates the mode of fastening the same to the cutter-bar.

A represents the frame of my machine, constructed as shown in figs. 1 and 2, and provided at the top with a cross-piece, B, behind which the operator stands, with his hands on said cross-piece and pushing the machine in front of him.

The machine rests upon a common driving-wheel, C, mounted beneath the frame-work behind the finger-bar D, and upon two rollers, *a a*, one at each end, in rear of the finger-bar, to balance the machine.

The driving-wheel C is loose on its shaft *b*, and a ratchet-wheel, *d*, is secured on said shaft, on one side of the driving-wheel, with a pawl, *c*, attached to the driving-wheel, and working in the ratchet-wheel in such a manner that when the machine moves forward the shaft turns and drives the gearing, but when moving backward the gearing stands still.

On the other side of the driving-wheel C there is a large cog-wheel, E, keyed onto the shaft *b*, which gears with a pinion, *f*, upon the lower end of a shaft, *h*.

On the upper end of this shaft is a crank, *k'*, which connects with a pitman, G, working across the top of the frame.

This pitman connects with a bolt and movable joint in the upper arm of a rocking lever H, pivoted on the frame A, and the lower end of which lever extends down to a pin, *i*, in a pitman, I, which is fastened to the end of the cutter-bar J.

The knives or blades K are provided either with a circular or dovetail shank, *k*, with a hole in the center to admit a round projection, *m*, on the cutter-bar J, and lie in a correspondingly-shaped recess in the cutter-bar.

In the center of the round projection *m* there is a hole for a screw to go in.

In fig. 2 I have represented two of the knives or blades fastened down by means of long-headed screws *n n*, so as to clearly show the construction and mode of inserting the blades in the cutter-bar.

The other four blades are fastened down by means of a thin band or plate, L, bolted or screwed down over them to keep them in their places, the bolts or screws *o o* passing down through the center of the circular projections *m m*.

The band or plate L has its ends slipped in under the end-plates *p p*, which are riveted firmly to the cutter-bar J, and by this arrangement the ends are firmly kept down and kept from springing up.

This mode of fastening the blades to the cutter-bar may be applied to any mower or harvester.

M M represent the guards or fingers, of which in a machine having six blades or sections, as shown in the drawing, I use eleven, namely, one for every point, and one for every joining of the blade.

By these extra guards, when the cutter-bar moves, the blade has a guard immediately at the cutting-edge to enter into and cut the one-half on the first guard, and the other half on the second, instead of being obliged to press or push forward the grass one-half of the sweep forward till the blade gets to the guard, as is the case in the old style, and thereby clogging the guard and overloading it, and in so doing rendering the cutting harder to do.

It is the guard that enables the knife to cut, and prevents the grass from bending away from the knife; hence, where, for instance, the blade is four inches broad, when there is but one guard to each blade, thin or light grass, like lawn and meadow-grass, will bend before the blade the first two inches, and not cut until the blade enters the guard, and in lawn-grass will bend and slip under the blade without cutting off.

In large mowing-machines this is not so readily perceived, on account of horses pulling and the knife moving with great speed; and if clover is cut, the stock is stiff and is cut, to some extent, through or by the velocity of the knife.

The gearing for this machine is represented as single, but in large machines compound gearing must in some cases be resorted to, to give speed to the cutter-bar.

If the blades are long and reach far enough in the grass, then single gearing may be made to do; but if the blade is shorter, then compound gearing is needed. In such cases, a spur-wheel is first put on the driving-wheel shaft, and a pinion working into it, and on the shaft of this pinion a bevel-wheel is placed, and a small bevel-pinion working into it with a crank on the end of the shaft, the same as represented in the drawing.

By means of the rocking-lever H driving the cutter-bar I am enabled to throw the gearing out of the grass and bring it above the shaft of the driving-wheel. This is of some importance to prevent the grass from interfering.

Having thus fully described my invention.

What I claim as new, and desire to secure by Letters Patent, is—

1. The cutter-bar J, provided with recesses in its upper surface, and a circular projection, m, in the center of each recess, substantially as and for the purposes herein set forth.

2. The combination of the knives K K with their shanks k k, the recessed cutter-bar J with projections m m, and the plate or band L with screws or bolts o o, all substantially as and for the purposes herein set forth.

3. The arrangement of the frame A, driving-wheel shaft b, driving-wheel C, ratchet-wheel d, spring e, cog-wheel E, pinion f, crank k', pitman G, and lever H, all as shown and described, in relation to the reciprocating cutter-bar, and for the purposes set forth.

In testimony that I claim the foregoing I have hereunto set my hand this 11th day of August, 1870.

ZURIEL SWOPE.

Witnesses:
REUBEN H. LONG,
WM. B. WILEY.